Feb. 13, 1934.  R. B. HUNTER  1,947,263
MOTOR CONTROLLER
Filed Aug. 31, 1931  2 Sheets-Sheet 2
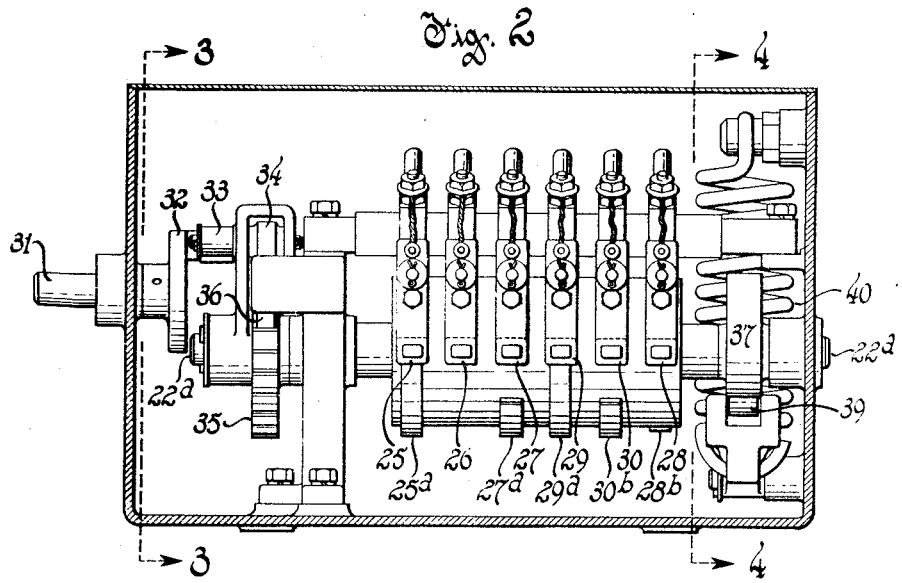
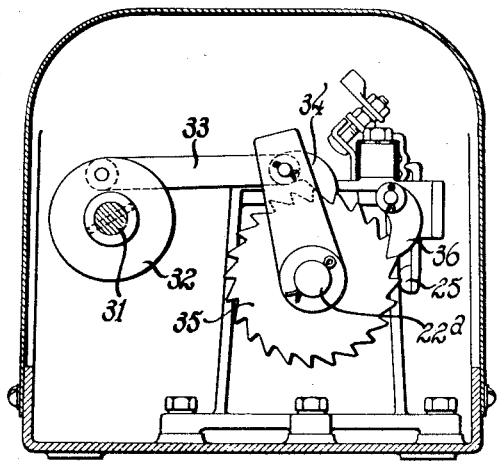
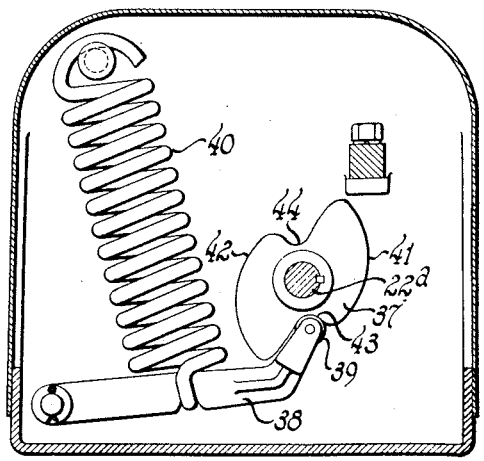
Richard B. Hunter, Inventor
By Frank H. Hubbard, Attorney Patented Feb. 13, 1934

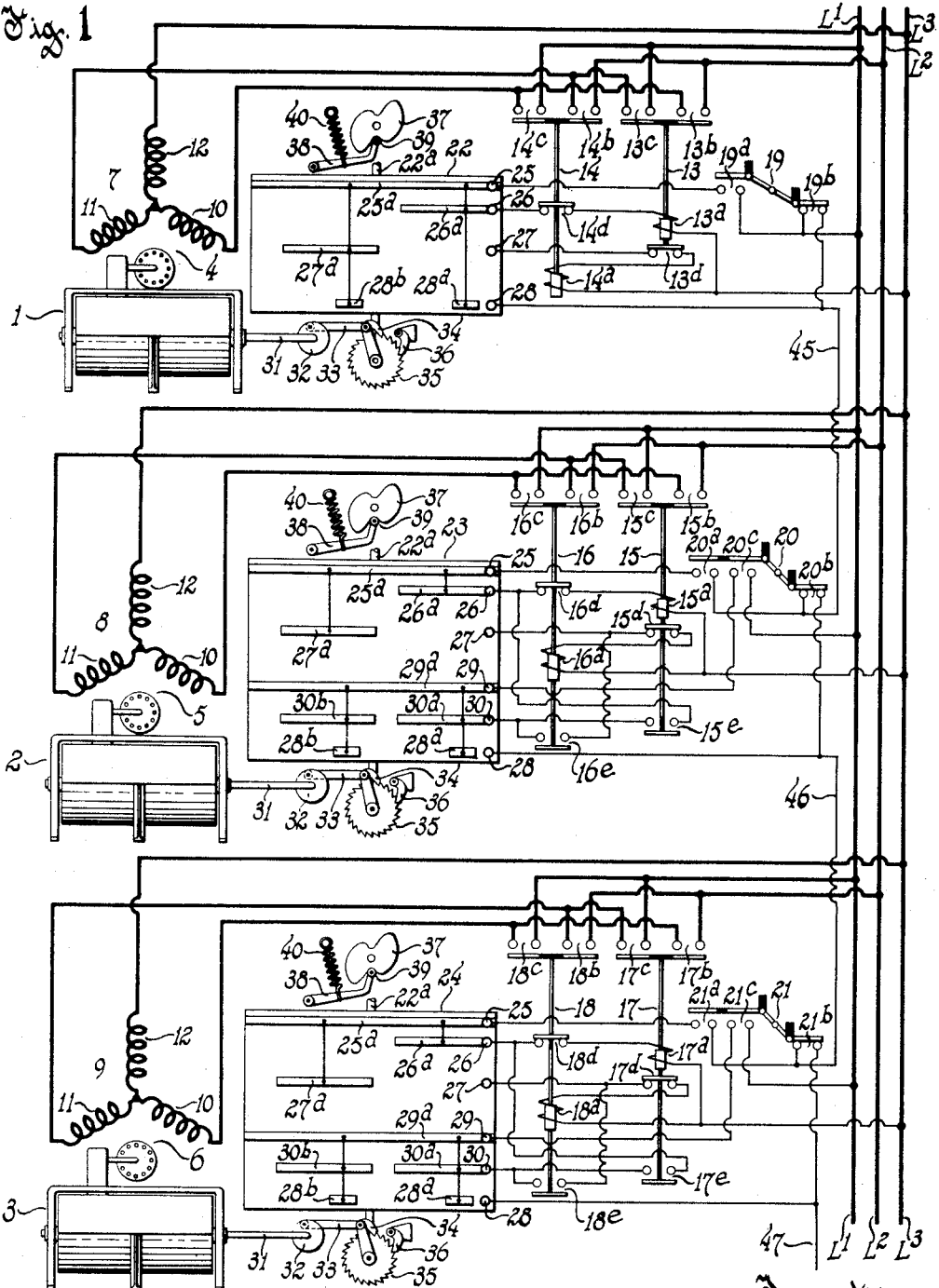

1,947,263

UNITED STATES PATENT OFFICE 1,947,263

MOTOR CONTROLLER

Richard B. Hunter, Shorewood, Wis., assignor to Cutler-Hammer, Inc., Milwaukee, Wis., a corporation of Delaware Application August 31, 1931. Serial No. 560,290

5 Claims. (Cl. 172—240)

This invention relates to improvements in motor controllers, and more particularly to a control system for the reversible driving motors of a plurality of rotary washing machines or the like.

The invention has among its objects to provide simple control means of the aforementioned character which provides for sequential establishment of starting connections and sequential commutation of running connections for a plurality of electric driving motors.

Another object is to provide a control system of the aforementioned character including means to insure sequential establishment of plugging connections for the driving motors.

Another object is to provide a control system including a control drum and means cooperable therewith for insuring against establishment of plugging connections for more than one motor at a time, whereby occurrence of excessive current peaks in the supply lines is avoided.

Another object is to provide simple and efficient means for controlling starting, running, reversing and stopping of a plurality of electric motors driving washing machines or the like.

Another and more specific object is to provide a novel form of ratchet-operated control drum together with means operable automatically to accelerate movement of the drum during certain portions of its travel.

Other objects and advantages of the invention will hereinafter appear.

The accompanying drawings illustrate an embodiment of the invention which will now be described, it being understood that the embodiment illustrated is susceptible of modification without departing from the scope of the appended claims.

In the drawings, Figure 1 illustrates schematically and diagrammatically a system embodying my invention as applied to the control of a plurality of reversible driving motors for rotary washing machines of a well known form.

Fig. 2 is a side elevational view of a control drum which forms part of the system illustrated in Fig. 1,—the drum casing being shown in section.

Figs. 3 and 4 are sections on lines 3—3 and 4—4, respectively, of Fig. 2, illustrating in detail various mechanical parts of the control drum.

Referring to Fig. 1 of the drawings, the same illustrates a plurality of rotary washing machines 1, 2 and 3 which are adapted to be driven by the three-phase reversible induction motors 4, 5 and 6, respectively, said motors being shown as of the squirrel cage type, although other types of motors may be employed if desired. Said motors are respectively provided with star-wound fields 7, 8 and 9, each comprising windings 10, 11 and 12, and adapted to be supplied with current from a common source of supply indicated by lines $L^1$, $L^2$, $L^3$, through pairs of reversing switches 13, 14,—15, 16,—17, 18. Said switches are each provided with two sets of normally open main contacts $13^b$, $13^c$, $14^b$, $14^c$, etc., each of the same being also provided with normally closed auxiliary contacts $13^d$, $14^d$, etc., and switches 15 to 18 are further provided with normally open maintaining contacts $15^e$, $16^e$, etc. Energization of operating windings $13^a$, $14^a$, etc. of switches 13 to 18 is dependent upon closure of left-hand contacts $19^a$, $20^a$, $21^a$ of manually operable push-button switches 19, 20, 21 and is further dependent upon engagement of certain of the stationary and movable contacts of the control drums 22, 23, 24 as hereinafter more fully set forth. The push-button switches 19, 20, 21 are also provided with right-hand contacts $19^b$, $20^b$, $21^b$, and switches 20 and 21 are further provided with an additional set of left-hand contacts $20^c$ and $21^c$. The control drums 22, 23, 24 are provided with stationary contacts 25, 26, 27, 28, continuous peripheral contacts $25^a$, segmental contacts $26^a$, $27^a$, $28^a$, $28^b$, and the drums 23 and 24 are further provided with stationary contacts 29, 30, continuous peripheral contacts $29^a$ and segmental contacts $30^a$, $30^b$.

The mechanical operation of the control drums will now be described in connection with washing machine 1. The control drum 22 is adapted to be rotated in a step by step manner in a clockwise direction by the cylindrical tub of the washing machine through the medium of a ratcheting mechanism comprising a shaft 31, which may be directly connected to the washer cylinder, a disk 32 carried by said shaft, a link 33 eccentrically pivoted upon said disk, a pawl 34 carried by said link, a ratchet wheel 35, and a restraining pawl 36. In operation the pawl 34 is reciprocated by the eccentrically pivoted link 33 and is adapted to engage one of the teeth of ratchet wheel 35 to effect a predetermined degree of rotation of the latter upon each forward stroke of said link. It should be noted that while the cylindrical tub of the washing machine rotates in opposite directions periodically, the controller 22 is rotated unidirectionally by the means aforedescribed.

The ratcheting mechanism is located at one end of the control drum 22, a drum positioning device being located at the opposite end, said device comprising a two-lobed cam 37 keyed or otherwise secured to the shaft 22ª of control drum 22. A pivoted lever 38, associated with said device, is provided with a roller cam follower 39, which is biased against the edge of cam 37 by a relatively strong spring 40. As the controller 22 rotates, the follower 39 rides from the position shown in Fig. 1 up the rising slope of lobe 41 (Fig. 4) of cam 37 until it reaches the high point thereof, whereupon under the pull of spring 40 it descends the relatively steep slope of said lobe, effecting rotation of said cam until it reaches the low point 44. Thus under the driving power of spring 40 the aforedescribed device effects positive positioning of control drum 22 which is of particular advantage in the event that the left-hand contacts 19ª of push-button switch 19 have been opened to stop the operation of the machine, and control drum 22 happens to stop in such a position that segmental contact 26ª or 27ª has just disengaged stationary contact 26 or 27. The control drum will then be positively rotated the few degrees corresponding to the gaps between the ends of segments 26ª and 27ª to effect engagement of the forward end of segment 26ª or 27ª with its respective stationary contact 26 or 27 to insure establishment of starting connections upon reclosure of the left-hand contacts 19ª of push button switch 19.

It will be noted in this connection that the roller follower 39 engages the low point 43 or 44 of cam 37 at the same instant that the stationary contacts 26 or 27 of drum 22 engage the forward ends of segments 26ª or 27ª. Also since segments 30ª and 30ᵇ of drums 23 and 24 are of the same length and occupy the same relative angular positions upon said drums as do segments 26ª and 27ª, they are in like manner affected by the positioning device aforedescribed. The gaps between the ends of segments 26ª and 27ª afford a time interval to allow reversing switches 13 and 14 to drop out and close the interlock contacts 13ᵈ and 14ᵈ associated therewith, since it is apparent that the contacts 13ᵈ must be closed before an energizing circuit for switch 14 can be established, and vice versa.

During the period in which the follower 39 is riding the rising slope 41 or 42 of cam 37, the force of spring 40 exerted through lever 38 and roller 39 upon cam 37 tends to rotate drum 22 in a reverse or counter-clockwise direction upon release of ratchet wheel 35 by pawl 34, but is prevented from so doing by restraining pawl 36.

While I have illustrated in connection with motor 4 a control unit from which certain of the elements, included in the units associated with motors 5 and 6 have been eliminated as being unnecessary for the practical operation of the system as herein described, it is obvious that for purposes of standardized manufacture control units of the type associated with motors 5 and 6 may be employed throughout.

The function and operation of the aforedescribed control system will now be more fully set forth. Assuming closure of the left-hand contacts 19ª, 20ª, 20ᶜ, 21ª, 21ᶜ of push-button switches 19, 20, 21 and further assuming the other parts of the system to be in the positions illustrated in Fig. 1, starting connections for motor 4 are set up as follows. An energizing circuit for switch 13 is established, said circuit extending from line L¹, through contacts 19ª of push-button switch 19, to and through stationary contact 25 of drum 22, continuous contact 25ª, segment 26ª and stationary contact 26, through normally closed contacts 14ᵈ of switch 14, and through winding 13ª to line L³. Response of switch 13 establishes an energizing circuit for forward operation of motor 4, one branch of said circuit extending from line L² through contacts 13ᵇ, to and through windings 10 and 12 of field 7 to line L³, the other branch of said circuit extending from line L¹ through contacts 13ᶜ to and through windings 11 and 12 of said field to line L³. The motor 4 thus operates to effect forward rotation of the cylindrical tub of washing machine 1, which in turn effects step by step clockwise rotation of drum 22, as hereinabove set forth.

Shortly after motor 4 has attained normal running speed, segment 28ª of drum 22 engages stationary contact 28, completing an energizing circuit for switch 15 associated with motor 5, said circuit extending from line L¹ through contacts 19ª of push button switch 19, to and through stationary contact 25 of drum 22, continuous contact 25ª, segment 28ª, and stationary contact 28, by conductor 45 through contacts 20ª of push button switch 20, to and through stationary contact 25 of drum 23, continuous contact 25ª, segment 26ª and stationary contact 26, through normally closed contacts 16ᵈ of switch 16 and through winding 15ª to line L³. Response of switch 15 establishes starting connections for forward operation of motor 5 to effect forward rotation of the cylindrical tub of washing machine 2, which in turn effects step by step clockwise rotation of drum 23. Switch 15 maintains itself energized upon disengagement of segment 28ª and contact 28 of drum 22 by a circuit extending from line L¹ through contacts 20ᶜ of push button switch 20, to and through stationary contact 29 of drum 23, continuous contact 29ª, segment 30ª and contact 30, through contacts 15ᵉ of switch 15, through normally closed contacts 16ᵈ of switch 16 and through winding 15ª to line L³.

Shortly after motor 5 has attained normal running speed, segment 28ª of drum 23 engages contact 28, completing an energizing circuit for switch 17 associated with motor 6, said circuit extending from line L¹ through contacts 20ᶜ of push button switch 20, to and through contact 29 of drum 23, continuous contact 29ª, segment 28ª and contact 28 by conductor 46 through contacts 21ª of push-button switch 21, to and through contact 25 of drum 24, continuous contact 25ª, segment 26ª and contact 26, through normally closed contacts 18ᵈ of switch 18 and through winding 17ª to line L³. Response of switch 17 establishes starting connections for forward operation of motor 6 to effect forward rotation of the cylindrical tub of washing machine 3, which in turn effects step by step clockwise rotation of drum 24. Switch 17 maintains itself energized upon disengagement of segment 28ª and contact 28 of drum 23 by a circuit extending from line L¹ through contacts 21ᶜ of push button switch 21, to and through contact 29 of drum 24, continuous contact 29ª, segment 30ª and contact 30, to and through contacts 17ᵉ of switch 17, through normally closed contacts 18ᵈ of switch 18 and through winding 17ª to line L³. The contact 28 and segment 28ª of drum 24 may, in the manner aforestated in connection with motors 4 and 5, effect the establishment of starting connections for still another motor through the conductor 47.

After a predetermined period of forward operation of motor 4 as determined by the length of segment 26ª of drum 22, the latter disengages contact 26, whereupon switch 13 drops out to effect deenergization of field 7 of said motor, the contacts 13$^d$ being simultaneously closed for the purpose aforementioned. The cam device 37 then operates as aforestated to position drum 22 to effect engagement of segment 27$^a$ with contact 27 for establishment of an energizing circuit for switch 14, which circuit extends from line L$^1$, through contacts 19$^a$ of push-button switch 19, to and through contact 25 of drum 22, continuous contact 25$^a$, segment 27$^a$ and contact 27, through normally closed contacts 13$^d$ of switch 13 and through winding 14$^a$ to line L$^3$. Response of switch 14 establishes an energizing circuit for reverse operation of motor 4, one branch of said circuit extending from line L$^2$ through contacts 14$^b$, to and through windings 11 and 12 of field 7 to line L$^3$, the other branch of said circuit extending from line L$^1$ through contacts 14$^c$, to and through windings 10 and 12 of said field to line L$^3$. Motor 4 thus operates to effect reverse rotation of the cylindrical tub of washing machine 1, which as hereinbefore set forth effects continued step by step clockwise rotation of drum 22.

Shortly after commutation of running connections for motor 4 has been effected, the segment 26$^a$ of drum 23 disengages contact 26, whereupon switch 15 drops out to effect deenergization of field 8 of motor 5, the contacts 15$^d$ being closed simultaneously. The cam device 37 then operates to position drum 23 to effect engagement of segment 27$^a$ with contact 27 for establishment of an energizing circuit for switch 16. Said circuit, however, can only be completed upon engagement of segment 28$^b$ of drum 22 with contact 28, and extends from line L$^1$, through contacts 19$^a$ of push-button switch 19, to and through contact 25 of drum 22, continuous contact 25$^a$, segment 28$^b$ and contact 28 by conductor 45 through contacts 20$^a$ of push-button switch 20, to and through contact 25 of drum 23, continuous contact 25$^a$, segment 27$^a$ and contact 27, through normally closed contacts 15$^d$ of switch 15 and through winding 16$^a$ to line L$^3$. Response of switch 16 establishes reverse running connections for motor 5 to effect reverse rotation of the cylindrical tub of washing machine 2, which in turn effects step by step clockwise rotation of drum 23. Switch 16 maintains itself energized upon disengagement of segment 28$^b$ and contact 28 of drum 22 by a circuit extending from line L$^1$ through contacts 20$^c$ of push-button switch 20, to and through contact 29 of drum 23, continuous contact 29$^a$, segment 30$^b$ and contact 30, through contacts 16$^e$, through normally closed contacts 15$^d$ of switch 15 and through winding 16$^a$ to line L$^3$ Shortly after commutation of running connections for motor 5 has been effected, the segment 26$^a$ of drum 24 disengages contact 26, whereupon switch 17 drops out to effect deenergization of motor 6, the contacts 17$^d$ being closed simultaneously. The cam device 37 operates to move drum 24 to effect engagement of segment 27$^a$ with contact 27 to prepare for establishment of an energizing circuit for switch 18, which circuit is completed upon engagement of segment 28$^b$ of drum 23 with contact 28, and extends from line L$^1$ through contacts 20$^c$ of push-button switch 20, to and through contact 29 of drum 23, continuous contact 29$^a$, segment 28$^b$ and contact 28 by conductor 46 through contacts 21$^a$ of push-button switch 21 to and through contact 25 of drum 24, continuous contact 25$^a$, segment 27$^a$ and contact 27 through normally closed contacts 17$^d$ of switch 17 and through winding 18$^a$ to line L$^3$. Response of switch 18 establishes reverse running connections for motor 6 to effect reverse rotation of washing machine 3 and consequent step by step clockwise rotation of drum 24. Switch 18 maintains itself energized by a circuit extending through its contacts 18$^e$ in the manner aforedescribed in connection with switch 16.

The period of reverse operation of motors 4, 5 and 6 is determined by the length of segments 27$^a$, and when segment 27$^a$ of drum 22 disengages contact 27, switch 14 drops out to deenergize field 7 of motor 4. Cam device 37 thereupon moves drum 22 to effect engagement of segment 26$^a$ with contact 26 to establish an energizing circuit for switch 13 as hereinbefore described, and response of switch 13 establishes forward running connections for motor 4. Forward running connections for motors 5 and 6 are thereafter sequentially established in the manner hereinbefore described and the cycle of operation is thus repeated and continues until the contacts 19$^a$, 20$^a$, 20$^c$, 21$^a$ and 21$^c$, of push-button switches 19, 20 and 21 have been opened.

While the aforedescribed system provides for electrically interlocked control of a plurality of motors, it will be seen that each of the motors may be operated independently, or as many of the motors as desired may be operated under electrically interlocked control.

If it is desired to operate motor 4 independently it is only necessary to close contacts 19$^a$ of push-button switch 19 to effect response of switch 13 or 14, depending upon the position of drum 22, for establishment of either forward or reverse running connections for said motor. If it is desired to operate motor 5 independently, the contacts 20$^a$ of push-button switch 20 are only required to be closed. The control circuit for the winding 15$^a$ or 16$^a$ of switches 15 and 16 is then completed through contacts 19$^b$ of push-button switch 19 by conductor 45 to and through contacts 20$^a$ of push-button switch 20, and through winding 15$^a$ or 16$^a$ as previously traced. In other words, if it is desired to operate any one of the machines independently, it is only necessary to close the contacts 19$^a$, 20$^a$, or 21$^a$ of the push-button switch associated with the selected motor.

When a plurality of motors are to be subjected to electrically interlocked control, the left-hand contacts of the push-button switches associated with the selected motors are closed. For example, if it is desired to operate motors 4 and 6 conjointly, the left-hand contacts 19$^a$ of push-button switch 19 and the left-hand contacts 21$^a$, 21$^c$ of push-button switch 21 are closed, and assuming the other parts of the system to be in the positions illustrated in Fig. 1, forward running connections for motor 4 will be established as hereinbefore set forth. Segment 28$^a$ of drum 22 will thereafter engage the contact 28 to complete an energizing circuit for switch 17 associated with motor 6, said circuit extending from line L$^1$ through contacts 19$^a$ of push-button switch 19, to and through contact 25 of drum 22, continuous contact 25$^a$, segment 28$^a$ and contact 28 by conductor 45 through the right-hand contacts 20$^b$ of push-button switch 20 by conductor 46 through contacts 21$^a$ of push button switch 21 and through winding 17$^a$ as previously traced. If motors 5 and 6 are to be operated conjointly the left-hand contacts 20$^a$, 20$^c$, 21$^a$, 21$^c$ of push-button switches 20 and 21, respectively, are closed, completing an energizing circuit for switch 15 from line L$^1$ through right-hand contacts 19$^b$ of push-button switch 19 by conductor 45 through contacts 20$^a$ of push-button switch 20 and through winding 15ª as previously traced. Thereafter running connections for motors 5 and 6 are established as hereinbefore described.

It is apparent from the foregoing that the control system herein described provides for sequential establishment of starting connections, and regardless of the fact that the motors may possibly operate at slightly different speeds because of varying load conditions, or otherwise, the aforedescribed system insures sequential establishment of plugging connections for a plurality of motors, as the current supply to each of the motors 5 and 6 is interrupted at the end of each half cycle of operation, and said motors cannot be restarted in either direction until the segmental contacts 28ª or 28ᵇ of the drums associated with the motors 4 and 5, respectively, engage stationary contacts 28. Any or all of the motors may be stopped instantly by opening the left-hand contacts 19ª, 20ª, 20ᶜ and/or 21ª, 21ᶜ of the push button switches 19, 20, 21 associated with the respective motors.

While for purposes of illustration but three motors have been shown as being controlled in accordance with the invention, it will be obvious to those skilled in the art that any number of motors may be thus controlled.

What I claim as new and desire to secure by Letters Patent is:

1. In a controller for a plurality of electric motors to be supplied with energy from a common source, in combination, a plurality of reversing means, one for each motor, each of said reversing means including a pair of electromagnetically operable switches, a control drum comprising stationary and movable contact elements, said drum being operable unidirectionally by its respective motor to insure energization of said switches in sequence with respect to each other, and a push button switch having normally open and normally closed contacts, said normally open contacts when closed being adapted to render said drum effective to complete the energizing circuit of one or the other of said switches to initiate operation of its respective motor, the control drums associated with certain of said motors and the push button switches associated with other of said motors having additional contacts cooperatively related to each other to provide for starting and subsequent reversal of operation of all of the active motors at equally timed intervals relatively to each other.

2. In a controller for a plurality of electric motors to be supplied with energy from a common source, in combination, a plurality of reversing means, one for each motor, each of said reversing means including a pair of electromagnetically operable switches, a control drum comprising stationary and movable contact elements, said drum being operable unidirectionally by its respective motor to insure energization of said switches in sequence with respect to each other, and a push button switch having normally open and normally closed contacts, said normally open contacts when closed being adapted to render said drum effective to complete the energizing circuit of one or the other of said switches to initiate operation of its respective motor, the control drums associated with certain of said motors and the push button switches associated with other of said motors having additional contacts cooperatively related to each other to provide for starting and subsequent reversal of operation of all of the active motors at equally timed intervals relatively to each other, each of said push button switches being adapted upon opening of its normally open contacts and closure of its normally closed contacts to effect interruption of the energizing circuit of its associated motor and to relay control from the additional contacts on its respectively associated control drum to the additional contacts on another of said control drums or to the normally open contacts on one of said push button switches per se.

3. In a controller for a plurality of electric motors to be supplied with energy from a common source, in combination, a plurality of reversing means, one for each motor, each of said reversing means including a control drum comprising stationary and movable contact elements, said drum being normally operable unidirectionally in a step-by-step manner by its respective motor to effect intermittent reversal of the direction of operation of the latter, and a push button switch having normally open and normally closed contacts, each of said control drums having a plurality of rotary positions wherein the alternative circuit connections for its associated motor are interrupted and spring-biased cam elements associated with the respective drums to insure against stopping of the latter in any one of said last mentioned positions, said normally open push button contacts being adapted when closed to render said control drum effective to complete an energizing circuit for its associated motor for operation of the latter in one direction or the other, the control drums associated with certain of said motors and the push button switches associated with other of said motors having additional contacts cooperatively related to each other to provide for starting and subsequent intermittent reversals of all of the active motors at equally timed intervals relatively to each other, said push button switches being operable individually at will to effect stopping of the motors respectively associated therewith and to simultaneously relay timing control of the starting and reversing operations of the active motors to the control drums associated with the latter while insuring equality of the aforementioned time intervals under all conditions.

4. The combination with a plurality of rotary elements, of a separate electric motor operatively connected with each element, a circuit for each of said electric motors, and mechanism controlling the circuit of each motor to initiate operation thereof and to thereafter intermittently reverse its direction of rotation, each such mechanism including a reversing control drum having stationary and movable contacts, said drum being adapted to be driven unidirectionally in a step-by-step manner by its respectively associated motor and a push button switch having two operative positions, the push button switch associated with one of said motors being operable to render the latter immediately active at will, and said switch when so operated being also adapted to render ineffective for a predetermined period of time the push button switch and the control drum associated with another of said motors.

5. The combination with a plurality of rotary elements, of a separate electric motor operatively connected with each element, a circuit for each of said electric motors, and mechanism controlling the circuit of each motor to initiate operation thereof and to thereafter intermittently reverse its direction of rotation, each such mechanism including a reversing control drum comprising stationary and movable contacts, said drum being adapted to be driven unidirectionally in a step-by-step manner by its respectively associated motor and a push button switch having two operative positions, the push button switches associated with each of the motors being operable to render the latter individually active at will during inaction of the other motors, and each of said switches when so operated being adapted to render another of the same ineffective for completing the circuit of its associated motor pending lapse of a predetermined period of time.

RICHARD B. HUNTER.